United States Patent [19]

Swierczek

[11] Patent Number: 5,499,094
[45] Date of Patent: Mar. 12, 1996

[54] APPARATUS AND METHOD FOR MEASURING THE LENGTH AND WIDTH OF A SPOT OF LIGHT UTILIZING TWO DIFFERENT MASKS

[75] Inventor: Stephen A. Swierczek, Fairport, N.Y.

[73] Assignee: Eastman Kodak Company, Rochester, N.Y.

[21] Appl. No.: 361,090

[22] Filed: Dec. 21, 1994

[51] Int. Cl.⁶ .................. G01J 1/00; G01J 1/42; G01N 21/84
[52] U.S. Cl. .................. 356/121; 356/225; 356/431
[58] Field of Search .................. 356/121, 225, 356/124.5, 431

[56] References Cited

U.S. PATENT DOCUMENTS

| | | | |
|---|---|---|---|
| 3,612,885 | 10/1971 | Arnaud | 250/217 |
| 4,323,906 | 4/1982 | Ohnishi et al. | 346/76 L |
| 4,404,571 | 9/1983 | Kitamura | 346/108 |
| 4,408,163 | 10/1983 | Burr et al. | 324/404 |
| 4,542,392 | 9/1985 | Schulz-Hennig | 346/160 |
| 4,596,993 | 6/1986 | Erlichman. | |
| 4,828,384 | 5/1989 | Plankenhorn et al. | 356/121 |
| 4,848,902 | 7/1989 | Schickle et al. | 356/121 |
| 4,858,019 | 8/1989 | Ohara et al. | 358/474 |
| 5,060,283 | 10/1991 | Shiraishi | 382/47 |
| 5,105,296 | 4/1992 | Cho et al. | 359/196 |
| 5,267,012 | 11/1993 | Sasnett et al. | 356/121 |

FOREIGN PATENT DOCUMENTS

| | | | |
|---|---|---|---|
| 52-26242 | 2/1977 | Japan | 356/121 |
| 54-44581 | 9/1979 | Japan | 356/121 |
| 55-26458 | 2/1980 | Japan | 356/121 |
| 55-74407 | 6/1980 | Japan | 356/121 |
| 56-46433 | 4/1981 | Japan | 356/121 |
| 56-74029 | 6/1981 | Japan | 356/121 |
| 63-58119 | 3/1988 | Japan | 356/121 |
| 63-085319 | 4/1988 | Japan | 356/121 |
| 1-24717 | 5/1989 | Japan | 356/121 |
| 2-205740 | 8/1990 | Japan | 356/121 |
| 3-223630 | 10/1991 | Japan | 356/121 |
| 1596295 | 8/1981 | United Kingdom | 356/121 |

OTHER PUBLICATIONS

Fleischer, John M. and Hitz, C. Brech, "Gaussian Beam Profiling: How and Why: What is the Best Way to Measure the Diameter of A Gaussian Laser Beam?"; Laser And Optronics, May 87.

IBM Technical Disclosure Bulletin, vol. 17, No. 11, Apr. 1975, "Measuring Diameter of a Laser Beam" by D. W. Stafford, p. 3197.

IBM Technical Disclosure Bulletin, vol. 17, No. 3, Aug. 1974, "Measurement of Laser Beam Diameter" by L. D. Dickson and J. F. Smith, pp. 723–733.

Primary Examiner—Frank Gonzalez
Assistant Examiner—Jason D. Eisenberg
Attorney, Agent, or Firm—Clyde E. Bailey, Sr.

[57] ABSTRACT

A scanning spot (54) moves over a pair of masks (50, 58) provided with respective arrays of transverse slits (52) of varying widths along the path of the spot or of transverse windows (60) at varying positions along a line (62) at an angle ($\alpha$) to the path. Pulses of light passing through the slits and windows are detected ($56_W$, $56_L$) and corresponding signals compared (102, 122) to predetermined values to produce digital pulses which are directed to counters (92, 94) to provide digital displays (126, 128) of spot width and length. Corresponding analog signals also may be provided (130–136).

14 Claims, 7 Drawing Sheets

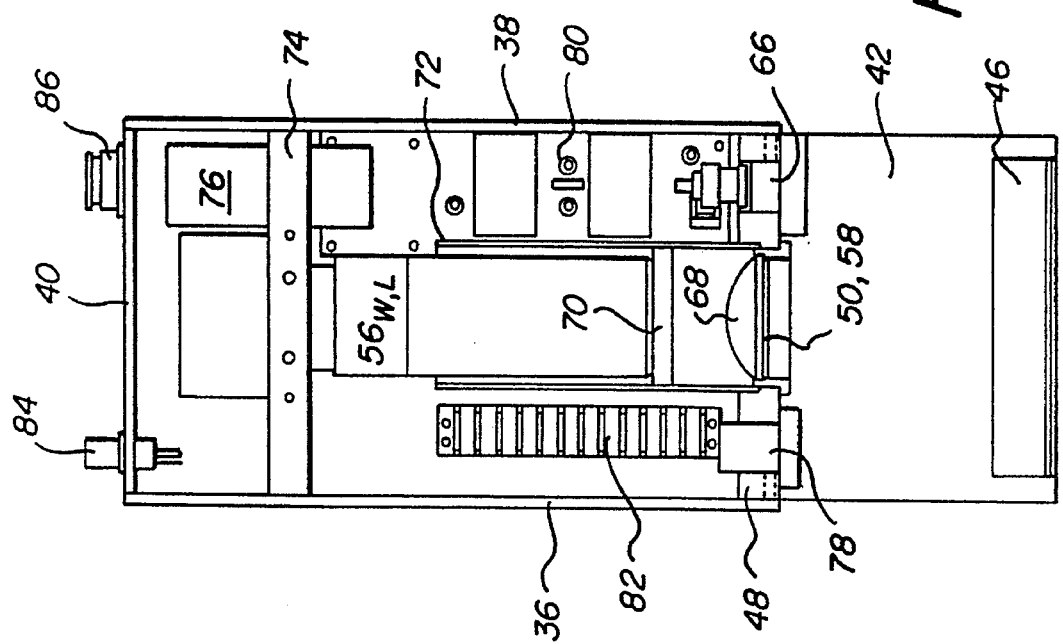
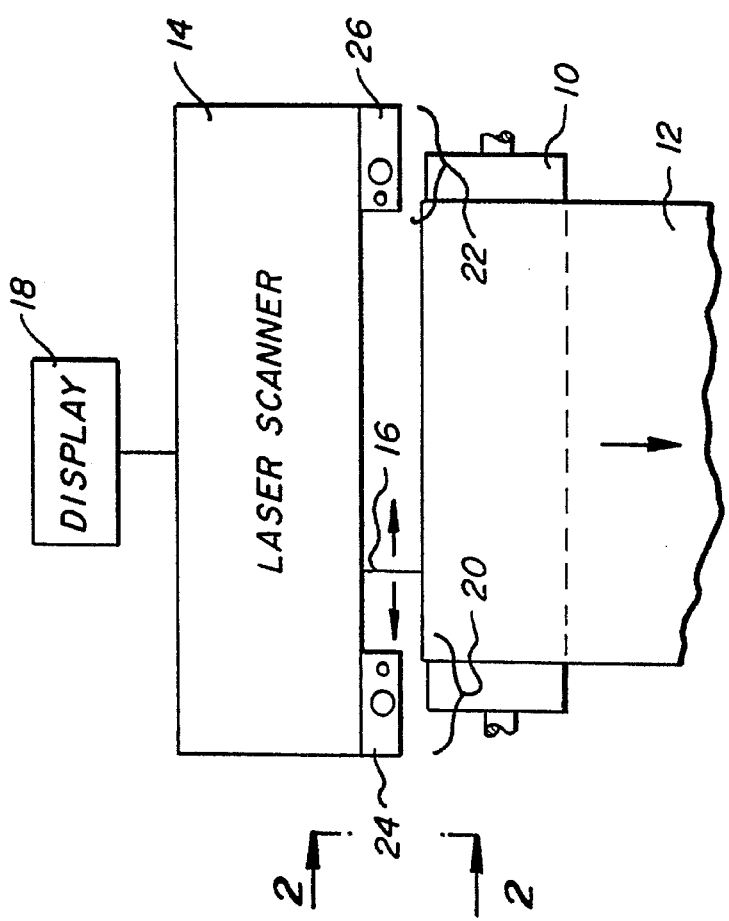

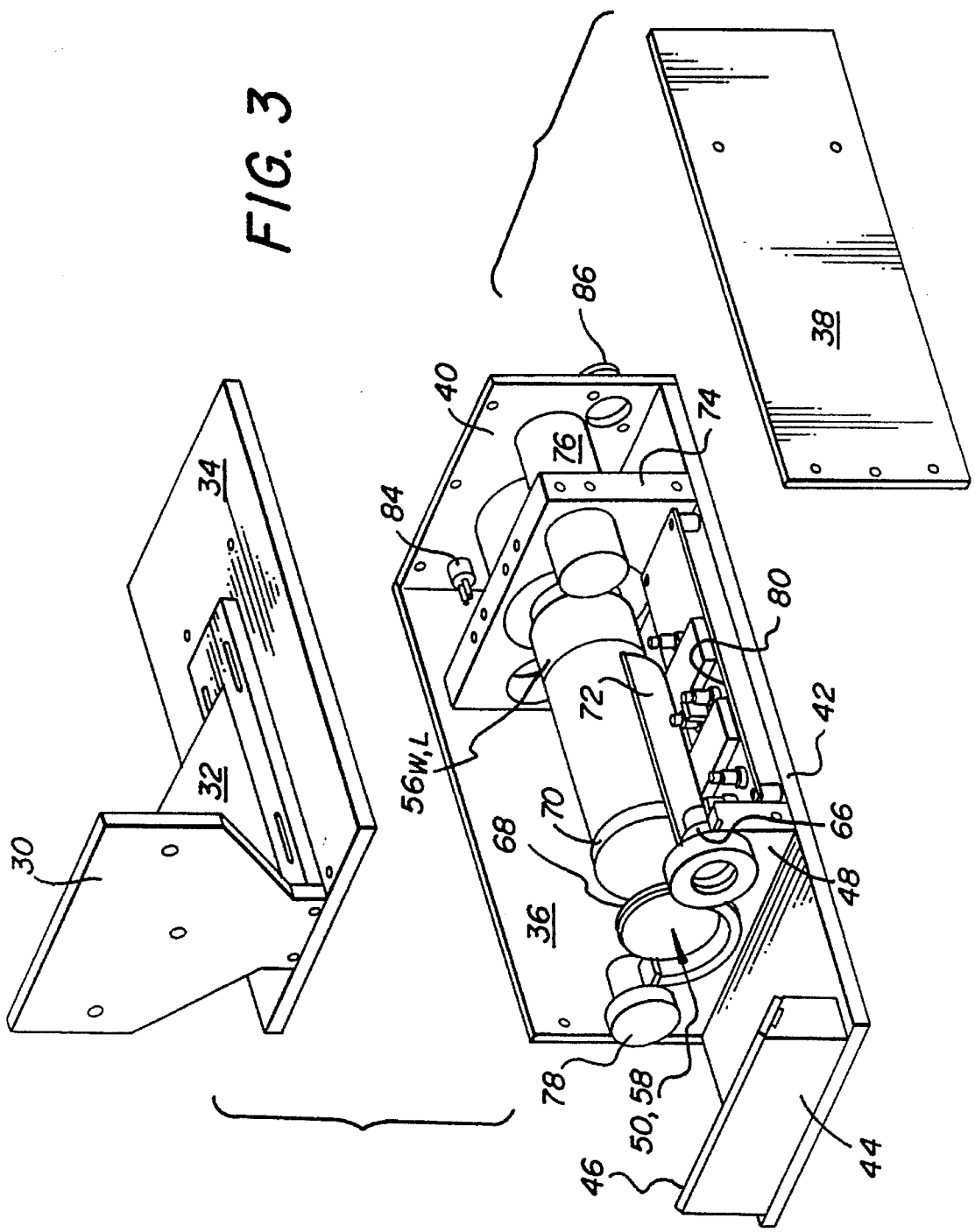

5,499,094

APPARATUS AND METHOD FOR MEASURING THE LENGTH AND WIDTH OF A SPOT OF LIGHT UTILIZING TWO DIFFERENT MASKS

TECHNICAL FIELD

The invention concerns methods and apparatus for scanning surfaces of materials using a scanning spot of light. More particularly, the invention is related to such methods and apparatus which include features for measuring and adjusting the size and shape of the scanning spot.

BACKGROUND OF THE INVENTION

Scanners using scanning or flying spots have found wide application in high resolution printing, document scanning, bar code scanning, and inspection, especially of continuous web materials. It is desirable at times to modify the size and shape of the scanning spot or its scan rate, or both, to accommodate special scanning situations. To do this, the scanner must monitor and measure the dimensions of the scanning spot, particularly its width in the scan direction and its length in the direction of the material movement. These measurements must occur while the equipment is in operation in order to provide feedback for continuous adjustment of the spot size.

Methods and equipment are readily available for measuring the dimensions of stationary spots, but the measurement of a scanning spot of light is much more complicated and obscure. Conventional spot width measurement techniques have been based on temporal measurements for inferring spot width, which require calculations affected by the velocity of the scanning spot. Similarly, conventional spot length measurement techniques have required arduous amplitude measurements complicated by scan-to-scan positioning error. Since both of these known methods require manual calculation or intervention during the measurement, neither of them lends itself to automatic feedback techniques for adjustment and control of the size and shape of the scanning spot.

SUMMARY OF THE INVENTION

The primary objective of my invention is to provide an apparatus and method for real time digital measurement of the width and length of a scanning spot of light, independent of its velocity and scan-to-scan positioning error, while providing analog output suitable for automatic feedback for adjustment and control of spot size.

My invention is defined by the claims. One embodiment comprises a pair of photodetectors, each positioned behind a mask made from an opaque plate upon which a transparent slit or window pattern has been etched. One detector provides information about the length of the scanning spot; and the other, about the width. The slit or window patterns are so arranged that light from the scanning spot will produce at each photodetector, pulses of light containing the desired dimensional information as the spot traverses the otherwise opaque plates.

The photodetectors convert the pulses of light to electrical signals, which are then quantized and counted to provide direct digital readouts of the spot dimensions. Analog signals, proportional to the measured spot dimensions, are also made available by digital to analog conversion of the counted values for remote readout, or automatic control of the spot dimensions, or both.

Applications for this invention include monitoring of the spot dimensions in laser printers and image digitizers, document copiers, bar code scanners, and inspection devices. In all of these applications, it is sometimes desirable to modify or control the dimensions of the scanning spot, or both, to accommodate the characteristics of the material or image being scanned or to maintain maximum resolution under varying scanning conditions. This invention, therefore, finds wide application in implementations for both spot size monitoring and closed loop spot size controlling.

The apparatus of my invention is particularly suited for real time measurement of the length and width of a spot of light. A first mask includes a plurality of transparent slits, each slit having a slit length at least as long as an expected maximum spot length, the slits having widths increasing incrementally from a fraction of the expected maximum spot width to at least the expected maximum spot width, and adjacent slits being spaced sufficiently to minimize illumination of more than one slit at a time. A second mask includes a plurality of transparent windows having lengths a fraction of an expected maximum spot length and widths sufficient to provide a window for transmitting a measurable pulse of light, the windows being positioned along a line and adjacent windows being spaced sufficiently to minimize illumination of more than one window at a time. A frame or similar member supports the first and second masks transverse to a path of relative movement between the spot and the masks, with the slits transverse to the path and the line of windows arranged at an angle to the path to provide, transverse to the path, a center-to center window spacing of a fraction of the expected spot length. At least one photodetector is provided for detecting pulses of light passing through the slits and producing first signals whose amplitudes are proportional to the power of the pulses of light and for detecting pulses of light passing through the windows and producing second signals whose amplitudes are proportional to the irradiance of the pulses of light. A first comparator determines if the amplitude of each first signal exceeds a predetermined value and producing a first digital pulse signal; and a first counter counts the first digital pulse signals as a measure of spot width. A second comparator determines if the amplitude of each second signal exceeds a predetermined value and producing a second digital pulse signal; and a second counter counts the second digital pulse signals as a measure of spot length. Rather than measuring width and length in a single apparatus as just described, separate apparatus may be provided for each dimension.

The spot may be scanning and the masks stationary; or, the spot may be stationary and the masks moving. Moving masks may translate or rotate. The slit width may increase to two and a half times the expected maximum spot width. The spacing between adjacent slits may be at least four times the expected maximum spot width. The spacing between windows may be at least five times the expected maximum spot width. The window widths may be approximately the same as the expected maximum spot width. The apparatus may be included in means for transporting a web to be scanned by the spot; and means may be provided for reflecting the spot to the masks, the means for reflecting being equidistant from the web and the masks. A lens and a diffuser may be provided between each mask and the photodetector.

One embodiment of the method of my invention may include the steps of providing a first mask having a plurality of transparent slits, each slit having a slit length at least as long as an expected maximum spot length, the slits having widths increasing incrementally from a fraction of the expected maximum spot width to at least the expected maximum spot width, and adjacent slits being spaced sufficiently to minimize illumination of more than one slit at a time; providing a second mask having a plurality of transparent windows having lengths a fraction of an expected maximum spot length and widths sufficient to provide a window for transmitting a measurable pulse of light, the windows being positioned along a line and adjacent windows being spaced sufficiently to minimize illumination of more than one window at a time; supporting the first and second masks transverse to a path of movement of the spot, with the slits transverse to the path and the line of windows arranged at an angle to the path to provide, transverse to the path, a center-to center window spacing of a fraction of the expected spot length; providing relative movement between a spot of light and the slits and windows; detecting pulses of light passing through the slits and producing first signals whose amplitudes are proportional to the power of the pulses of light; determining if the amplitude of each first signal exceeds a predetermined value and producing a first digital pulse signal; counting the first digital pulse signals as a measure of spot width; detecting pulses of light passing through the windows and producing second signals whose amplitudes are proportional to the irradiance of the pulses of light; determining if the amplitude of each second signal exceeds a predetermined value and producing a second digital pulse signal; and counting the second digital pulse signals as a measure of spot length. Rather than measuring width and length in a single method as just described, separate methods may be provided for each dimension.

My invention provides various advantages. Spatial, rather than temporal, references are used for spot size measurement. This eliminates the need to measure spot velocity and maintain precise timing calibration. Both digital and analog outputs are readily available for readout and feedback control of spot size. The scanning spot is sampled during the operation of the associated equipment, allowing real time control of spot size and alarming in the event of equipment malfunction. The spot size is measured on each and every scan allowing real time evaluation of the spot size for each facet of polygon scanning mirrors. Automatic gain control is easily incorporated to eliminate adjustments which are required by other methods for variations in scanning spot power level. Neither spot width nor length measurement is affected by scan beam landing error in the material movement direction or variation in spot velocity.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 1 shows a schematic elevation view of a web transport system including a laser scanner and apparatus for measuring the size of the scanning spot in accordance with my invention.

FIG. 3 shows an exploded, perspective view of an apparatus in accordance with my invention.

FIG. 4 shows a top view of the apparatus of FIG. 3, with the top plate removed.

DETAILED DESCRIPTION OF THE INVENTION

Figure 2:
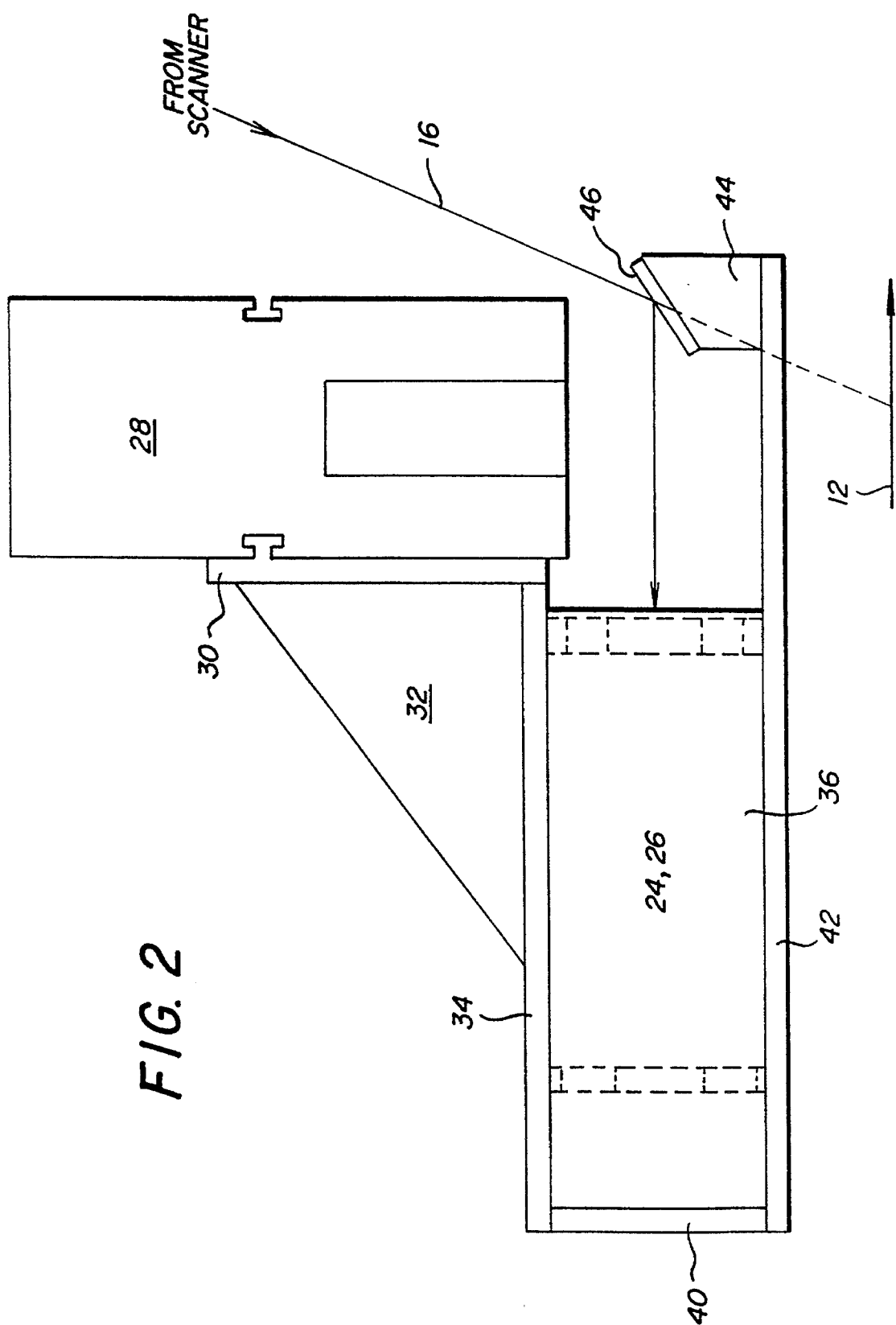
FIG. 2 shows a view along line 2—2 of FIG. 1.

The following is a detailed description of the preferred embodiments of the invention, reference being made to the drawings in which the same reference numerals identify the same elements of structure in each of the several Figures.

FIG. 1 shows a web transport system of a general type suitable for use in combination with my invention. A roller 10, which may be driven or idle, transports a web 12 in the familiar manner. A conventional laser scanner 14 produces a scanning beam of light 16 which sweeps repeatedly across the width of the moving web. A display 18 is provided for viewing the output of the scanner. In a typical application of such a scanner, at each end of the scan of beam 16 there are dead bands 20, 22 in which the beam scans uninteresting edge portions of web 12 or portions of the underlying roller 10. These dead bands thus provide a convenient opportunity to sample and measure the scanning beam. Accordingly, a pair 24, 26 of the apparatus of my invention are mounted at the opposite ends of scanner 14 to measure, respectively, the width and length of the scanning spot. Those skilled in the art will appreciate that apparatus 24, 26 could be combined and placed at one end of the scanner or at any desired location along the scan of beam 16, without departing from my invention.

The details of apparatus 24, 26 are shown in FIGS. 2 to 8. A frame member 28 may be attached to each end of scanner 14 to provide an attachment for a bracket plate 30. A gusset plate 32 extends between plate 30 and a top plate 34 of apparatus 24, 26. A pair of side plates 36, 38 and a rear plate 40 extend downwardly from top plate 34 to a bottom plate 42 which extends beyond side plates 36, 38. At the exposed end of bottom plate 42, a mounting block 44 is provided for supporting a planar, first surface mirror 46. As seen in FIG. 2, mirror 46 is positioned so that the distance from the reflecting surface of mirror 46 to the masks at the entrance to apparatus 24, 26 is the same as the distance from the reflecting surface to web 12. This ensures that apparatus 24, 26 will measure spot dimensions just as they exist on web 12. Apparatus 24, 26 are essentially identical, except for a pair of opaque masks or plates which are scanned by beam 16, one mask being used for width measurement and the other, for length measurement.

Spot Width Measurement

Figure 5:
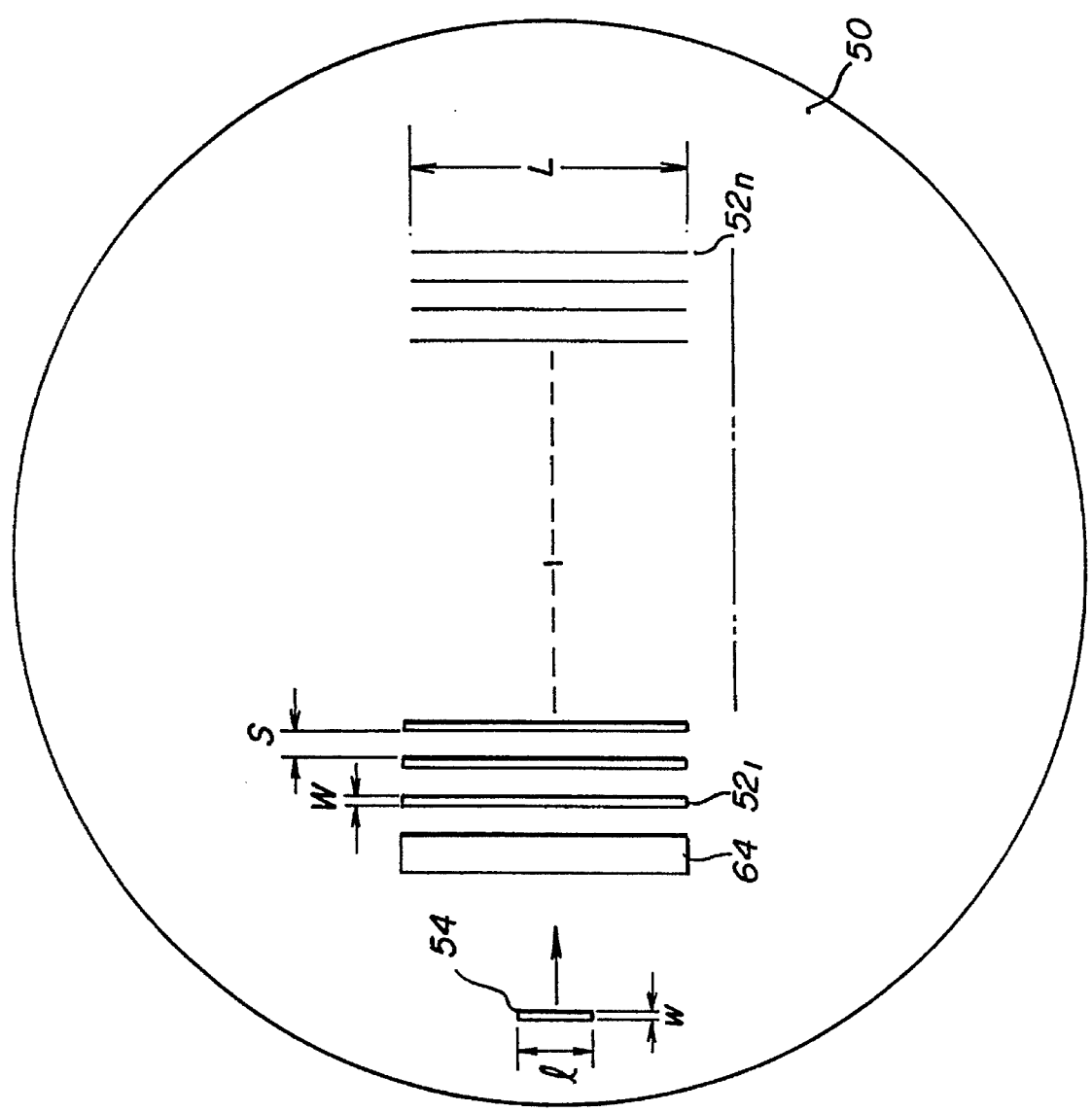
FIG. 5 shows a plan view of a width measuring mask in accordance with my invention.
Figure 8:
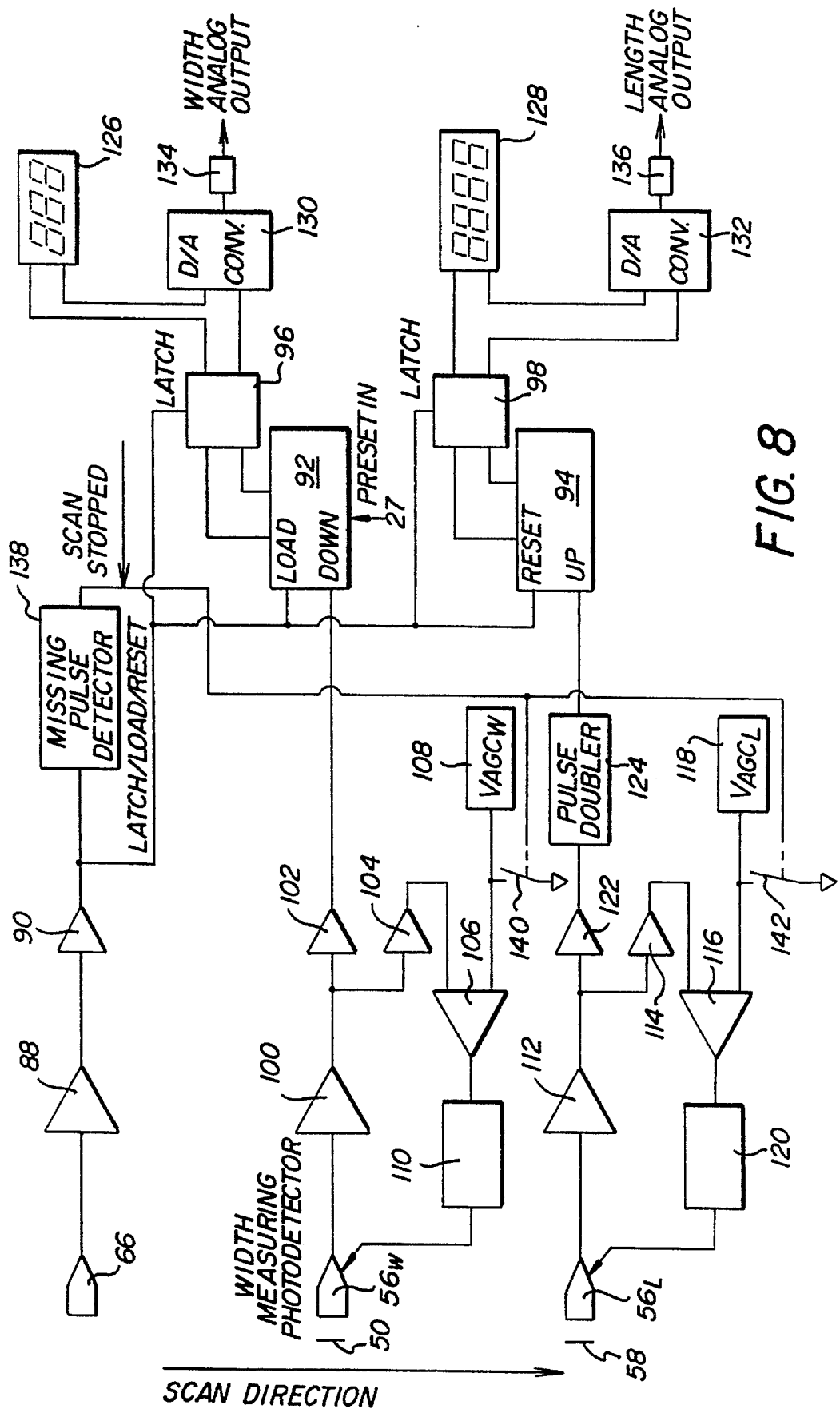
FIG. 8 shows a schematic diagram of the circuit for measuring and displaying scanning spot dimensions in accordance with my invention.

Spot width measurement is based on the relationship of the distribution of power across the scanning spot, the overall size and shape of the spot, and the amount of power in the spot that can pass through a slit of a known dimension. Those skilled in the art will understand that the apparatus and method of my invention are not limited to any particular spot power distribution or geometry. Opposite mirror 46, a front plate 48 is positioned on bottom plate 42 to support a width measuring mask or aperture plate 50 which comprises an opaque plate or disk, such as a glass plate coated with 4.0 density chrome. Mask 50 is spaced from mirror 46 at the same distance as web 12, as previously explained. As seen in FIG. 5, through the chrome coating is etched a series of slits $52_1 \ldots 52_n$. The slits preferably are straight and oriented essentially perpendicular to the width dimension and the scanning direction of a scanning spot 54 having a width w. However, particularly for round or nearly round scanning spots, the slits may be set at angles to the scanning direction, not illustrated. Width w is defined by the widthwise power distribution of the scanning spot. As seen in FIGS. 3, 4 and 8, the otherwise opaque mask 50 is positioned in front of a photodetector $56_W$ which collects all of the light that passes through the individual slits.

As viewed in the scanning direction, each slit is incrementally narrower in width W than its neighbor, so as to provide a multiplicity of slit widths to be illuminated sequentially by the scanning spot. The purpose of the initial wide slit 64 will be discussed subsequently. As viewed transverse to the scanning direction, the length L of the slits is made at least as long as and preferably much greater than the expected length /of scanning spot 54 to be measured. As a result, none of the power of beam 16 is lost along the length of the spot that illuminates each slit. The widths W of the slits are chosen to encompass a range of about 0.5 times to at least the maximum expected spot width w, and preferably about 2.5 times the expected spot width w. The spacings S between the edges of adjacent slits are also important, and are chosen to be sufficient to prevent scanning spot 54 from illuminating more than one measurement slit at any time. Slit spacings at least 4 times the widest measurement slot $52_1$ have provided good performance. The spacing between the slits need not be uniform.

As the scanning spot traverses the series of slits from the widest to the narrowest, progressively less and less of the power in the scanning spot width will be allowed to pass through the slits. Those skilled in the art will understand that the scan could proceed from the narrowest slit to the widest slit; and that the slits could be randomly arranged along the scan direction, without departing from the scope of my invention. Thus, pulses of light of diminishing power and perceived brightness are passed through mask 50 to photodetector $56_W$. The photodetector converts these diminishing pulses of light into electrical signals whose amplitudes are proportional to the amount of spot power passing through the slit. As will be discussed in detail regarding FIG. 8, any signal whose amplitude exceeds a predetermined value, defined by the relationship between the power distribution across the spot, the width of the spot, and the width of the slit, is converted to a digital pulse by a comparator circuit. The digital pulse is then passed to a down counter circuit, preset to a value one greater than a count representing the width dimension of the widest slit $52_1$. As light passes through each slit 52 that is wider than the width of the scanning spot, the pulse from the comparator circuit decrements the counter. Thus, the count stops at the value representing the widest slit width whose pulse just meets the predetermined comparison value.

This process repeats for each and every scan, so it is necessary to generate a signal, separate from the measurement, which latches the terminal count value for readout, then presets the counter for the next decrement cycle. The digital value stored in the latch, being an accurate representation of the spot width, is then passed to a digital to analog converter and a low pass filter. These provide an analog signal, representative of a running average value of all of the spot width readings, for feedback control of the spot width dimension or remote readout, or both.

Spot Length Measurement

Figure 7:
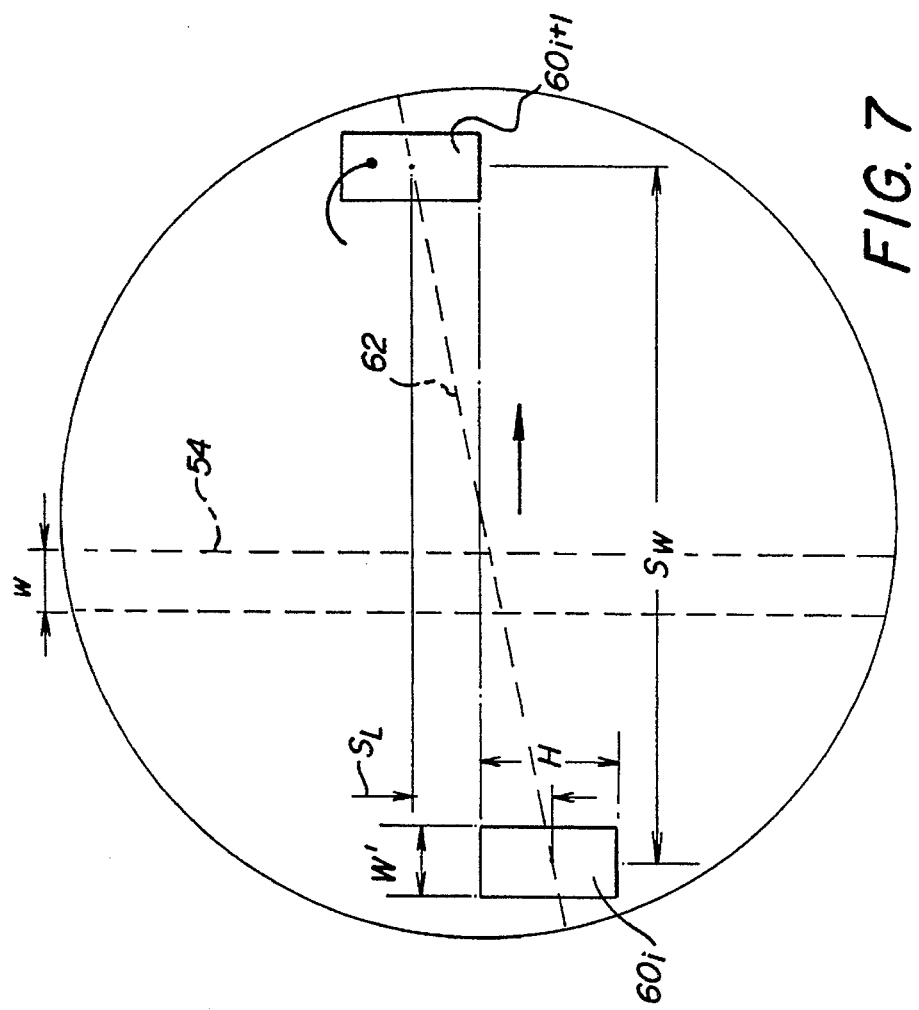
FIG. 7 shows an enlarged view of Detail 7 of FIG. 6.
Figure 6:
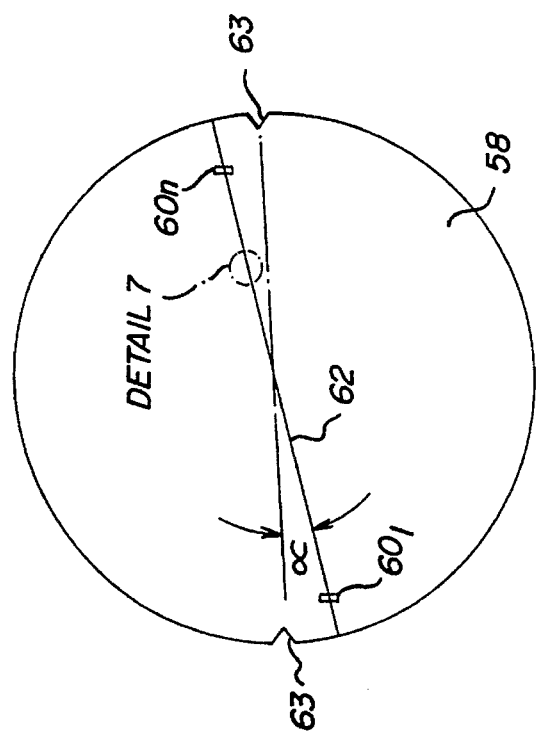
FIG. 6 shows a plan view of a length measuring mask in accordance with my invention.

Spot length measurement is similar to the spot width measurement just described, but is based instead on the relationship between the irradiance distribution of the spot length and the size, rather than the power distribution, in the spot. In the apparatus for measuring length, front plate 48 supports a length measuring aperture plate or mask 58. As seen in FIGS. 6 and 7, mask 58 comprises an opaque plate provided with a series of square or rectangular windows $60_1 \ldots 60_n$ spaced evenly along a diagonal line 62 across the face of the mask. Other window geometries also may be used. Line 62 is set at an angle $\alpha$ to the direction of scan of spot 54. Though windows $60_1 \ldots 60n$ are shown essentially perpendicular to the scan direction, those skilled in the art will appreciate that the windows may be angled to the scan direction without departing from the scope of my invention. The center-to-center spacing $S_W$ in the width direction between the windows is dependent upon the expected width w of the spot to be measured, and is chosen to be sufficient to minimize illumination of more than one window at a time. A spacing of at least 5 times the maximum expected width has provided good performance. The width W' of the windows is chosen to be sufficient to provide a window for transmitting a measurable pulse of light. Widths approximately the same as the nominal spot width w have provided good performance. The center-to-center spacing $S_L$ between the windows in the length direction of the spot is determined by the desired measurement resolution. The window height H can be as large as the center-to-center spacing $S_L$ of the windows, but preferably does not exceed 0.1 of the minimum expected spot length l. The maximum expected spot length l and the center-to-center spacing $S_W$ between windows 60 determine the angle $\alpha$ along which the windows are arranged.

As scanning spot 54 traverses mask 58, windows $60_1 \ldots 60_n$ are sequentially illuminated, more windows being illuminated during a scan by a longer spot than a shorter one and each pulse of light from a window representing an incremental distance along the spot length. As the windows are illuminated in sequence, a series of light pulses is produced, their irradiance (and perceived brightness) varying with the distribution of the irradiance along the length dimension of the spot. A photodetector $56_L$ disposed behind mask 58, and collecting all of the light that passes through the windows, converts the light pulses into electrical pulses, whose amplitudes are proportional to the irradiance of the light pulses. As will be discussed in detail regarding FIG. 8, any pulse whose amplitude exceeds a predetermined value based on the relationship between the irradiance distribution of the spot length and its size, is converted to a digital pulse by a comparator circuit and is passed on to an up-counter circuit that, starting from 0, accumulates the total number of length increments illuminated by the spot.

The repeating nature of the scanning process makes it necessary to latch the final count in a register for display and then reset the counter before each new scan. The digital value remaining in the register after each scan is an accurate measurement of the spot length, and is passed on to a digital to analog converter and low pass filter for remote readout or analog feedback control of spot length, or both.

One Embodiment of the Invention

A spot size measuring instrument has been constructed to measure the length and width of a 0.1 by 2.0 mm scanning spot 54 having Gaussian irradiance profiles in both directions. As shown in FIGS. 2 to 5, mask 50 is positioned effectively in the same plane as web 12, or another plane a like distance away, by partial or total reflection from mirror 46. In this preferred embodiment, the plate consists of transparent slits 52 etched through an opaque background coating. The slits range in 0.01 mm increments from 0.08 mm in width at slit $52_n$ up to 0.25 mm in width at slit $52_1$. A 1.0 mm spacing is provided between the edges of adjacent slits. Eighteen slits are arranged on a circular mask having a diameter in the range of 35 to 40 mm, the slits being about 10 mm long. The slits are shown in order of increasing width, but as previously indicated need not be for my invention. Also provided is an additional slit 64 of 1.25 mm width, which is included to provide a signal for automatic gain control of the width measuring photodetector $56_W$, a photomultiplier tube. The principle for width measuring requires that the photodetector compare the power emerging through the slits with the full power contained in the scanning spot. The full power signal is provided by slit 64 which can be made wider than 10 times the expected spot width, or as required for other than Gaussian scanning spots.

As shown in FIGS. 2 to 4, 6 and 7, mask 58 is disposed in the scan beam like mask 50. Thirty-five windows $60_1 \ldots 60_n$ are approximately the same width W' as the expected spot 54, are spaced about 1.0 mm center-to center ($S_W$), and are positioned and sized to provide a length measuring resolution of 0.2 mm. The windows are positioned along diagonal 62 to the centerline of a circular mask having a diameter in the range of 35 to 40 mm. Proper positioning of mask 58 in front plate 48 is ensured by providing diametrically positioned notches 63 to engage corresponding features in the front plate, not illustrated. The angle $\alpha$ of the diagonal is determined by the aperture height H (measuring resolution) and spacing $S_W$. In this embodiment, angle $\alpha$ is about 11.3°. It is possible to reduce the aperture height H and maintain the center to center vertical spacing $S_L$ of 0.2 mm, but this does not improve performance.

As shown in FIGS. 3 and 4, a photodiode 66 also is supported on front plate 48 in position to receive light from beam 16 at the start of a scan. Immediately behind mask 50 or 58 is mounted a plano-convex lens 68 whose plano surface directly contacts the mask. Lens 68 helps to correct for any diffractive effects of the mask. Light passing through lens 68 then encounters a diffuser disk 70 which serves to spread the light to the entire active surface of photodetector 56 and thus reduce nonuniformity. A conventional magnetic shield 72 is positioned around the detector, only half of the shield being shown for ease of illustration. A cross plate 74 supports photodetector 56 and a power supply 76. To permit positioning photodiode 66 on either side of mask 50, 58, an aperture plug 78 is inserted in an opposite mounting location for the photodiode. Circuit boards 80, terminal strip 82 and connectors 84, 86 complete the components of apparatus 24, 26.

FIG. 8 is a block diagram of a circuit for processing of signals generated upon scanning of masks 50, 58. The illustrated circuitry is for an embodiment in which both width and length are detected using an integrated apparatus having a single photodiode 66 and two photodetectors $56_W$ and $56_L$; however, those skilled in the art will appreciate that the width and length measurements can readily be separated for installation at opposite sides of the web as shown in FIG. 1, simply by providing a pair of photodiode circuits of the type now to be described. The start-of-scan photodiode 66 generates a current pulse on being scanned, which is converted to a voltage pulse by a transimpedance amplifier 88. The amplifier output is fed to a quantizer 90 which provides a logic level pulse which (1) latches the data at width and length increment counters 92, 94 in width and length increment registers 96, 98; (2) loads the width increment counter with the value 27; and (3) resets the length increment counter to zero. As the scan progresses, spot 54 traverses width aperture plate 50. The light pulses produced as the spot traverses the array of slits $52_1 \ldots 52_n$ are converted by photomultiplier tube $56_W$ into current pulses proportional to the power passing through each slit. The widest slit 64, at 1.25 mm, produces the highest current pulse as it results from the total power in the spot. A transimpedance amplifier 100 converts these current pulses into voltage pulses proportional to the current pulses and feeds them to a quantizer 102 and a peak detector 104. The peak detector holds the amplitude of the highest voltage pulse at its output and feeds this signal to a difference amplifier 106 connected as an automatic gain control circuit to a reference voltage source 108. Working in concert with a DC to DC converter 110 to provide a variable high voltage to photodetector $56_W$, the automatic gain control circuit maintains the highest pulse voltage into quantizer 102 at a predetermined level (1.0 volt in this embodiment) over a wide range of input power level in the scanning spot. This feature has the advantage of rendering the measurement immune to variations in scanning spot power level.

Quantizer 102 compares the voltage pulse amplitudes to a predetermined voltage based on the relationship between the width of the scanning spot, the power distribution in the spot (in this case for a Gaussian irradiance profile) and the known widths of the slits in the aperture plate. In this embodiment, it is desired to measure the spot width in which half the power in the scanning spot resides, and the comparison voltage is thus chosen to be 0.5 volt, or half of the peak voltage generated by the total power in the scanning spot. Comparison voltages for other width specifications can easily be determined for this embodiment by referring to tables available in common texts on statistics for "Area under the Normal Distribution" and "Ordinates of the Normal Distribution." If the amplitude of the voltage pulse to quantizer 102 exceeds 0.5 volt, a logic level pulse is generated at the quantizer output which decrements width increment counter 92 from its initially preset value of 27. This will always be the case for the 1.25 mm slit 64, since it is always larger than the expected spot size, and results in the counter decrementing to 26 from its preset value of 27. Continuing the scan, and assuming a spot width of 0.1 mm, the slits in width from 0.25 mm down to 0.11 mm will produce electrical pulses of sufficient amplitude to further decrement the counter through 25, 24, 23 . . . 13, 12, and 11. The remaining value in the counter, 10, thus indicates the two most significant digits of the spot width dimension, in microns.

The scan progresses to mask 58 where each window $60_1 \ldots 60_n$ which is illuminated by the scanning spot will produce a brief pulse of light on photodetector $56_L$, equivalent to 0.2 mm of spot length. These light pulses are converted into current pulses by the photodetector and then into voltage pulses, proportional to the irradiance of the light pulse, by a transimpedance amplifier 112. As in the width measuring case, a peak detector 114, difference amplifier 116, reference voltage source 118, and DC-DC converter 120 are used for automatic gain control of photodetector $56_L$ to insure accurate amplitude comparison in a quantizer 122 regardless of power level changes in the scanning spot.

Quantizer 122 compares the pulses from transimpedance amplifier 112 (peak amplitude controlled to 1.0 volt) with a voltage determined by the relationship between the irradiance profile of the scanning spot length and the spot width. For example, it may be desired to measure the spot width between which lies 50% of the total power in the scanning spot. Since the spot length irradiance, not power, profile is sampled by the apertures, examination of the curves for "Area Under the Normal Distribution", and "Ordinates of the Normal Distribution" reveals that ½ the power (area) under the Normal Distribution lies between ± 0.68 sigma, and that the relative irradiance (ordinate) at ±0.68 sigma is 0.8. Quantizer 122, therefore, is adjusted to compare the pulses from the transimpedance amplifier 112 with 0.8 volt. Any input pulse exceeding this value triggers a pulse doubler 124 which generates two pulses for every input pulse. The pulse doubler increments the length increment counter 94 by 2 for every quantizer pulse since each measurement window in the aperture plate corresponds to 0.2 mm of spot length. Assuming a spot length of 2.0 mm, ten of windows $60_1 \ldots 60_n$ that are illuminated by the scanning spot will produce pulses exceeding the quantizer comparison level as they are traversed sequentially by the scanning spot. These ten pulses will result in 20 pulses to the length increment counter 94 from the pulse doubler 124, causing the length increment counter to count up to 20.

These values, 10 in the width counter 92 and 20 in the length counter 94, are latched into the width and length measurement registers 96, 98 at the beginning of the next scan when the scanning spot traverses photodiode 66. Once stored in the registers, the values from the counters are displayed on digital displays 126, 128. Display 126 may show three digits; display 128, four digits. Simultaneously, the values are converted to analog values by digital to analog converters 130, 132. Since the increment between slit widths is known to be 0.01 mm (10 microns), but the counter decrements in units of one micron, display 126 is scaled to read ten times the value in the register, or 0.1 mm (100 microns). Similarly, the length increment is in hundreds of microns, so the length display 128 is scaled to read 100 times the length register value, or 2.0 mm (2000 microns). This scaling is accomplished simply by wiring the last display digit to read 0 and with proper positioning of the displayed decimal point. Digital to analog converters 130, 132 receive their respective width and length values from registers 96, 98 and convert these values to analog voltages scaled to 10 millivolts per micron of spot width or length. The analog outputs are then directed through low pass filters 134, 136 to remove any irregularities or rapid transitions in the analog output. The signal from filters 130, 132 may then be used as a smoothed feedback control signal consisting of a running average of the values measured over many scans.

Finally, a missing pulse detector 138 is provided to monitor the presence of the start of scan pulses from photodiode 66. Should the scan be stopped for any reason, or the spot light source be extinguished, the automatic gain control circuitry attempts to increase the gain of the photodetectors $56_W$, $56_L$ until a 1-volt peak signal arrives at the quantizer input. This leads to saturation of the automatic gain control circuitry and loss of gain control. To prevent this during the absence of a scanning spot, missing pulse detector 138 provides for a time interval in which at least one pulse must occur or the automatic gain control reference voltages (Vagcw and Vagcl) are clamped to 0 by closing switches 140, 142 to ground, effectively turning off the photodetectors and automatic gain control circuitry. This condition persists until another start of scan pulse retriggers the missing pulse detector to resume normal operation.

Figure 9:
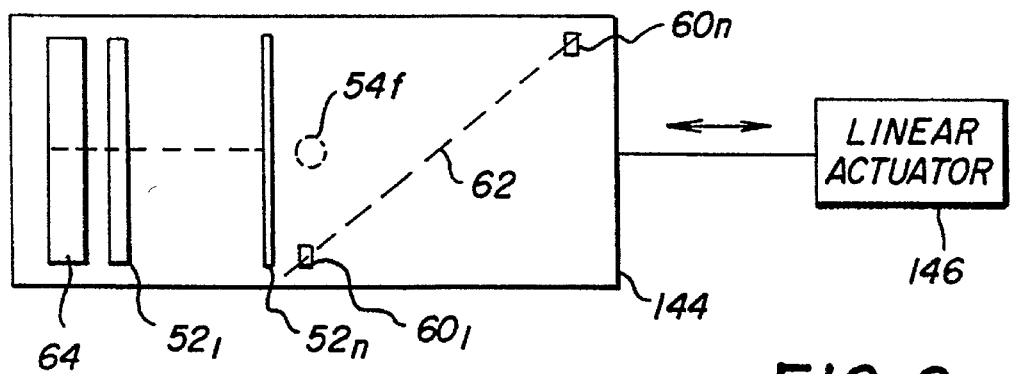
FIG. 9 shows a schematic view of an alternative embodiment of the invention having a translating mask for measuring a stationary spot.
Figure 10:
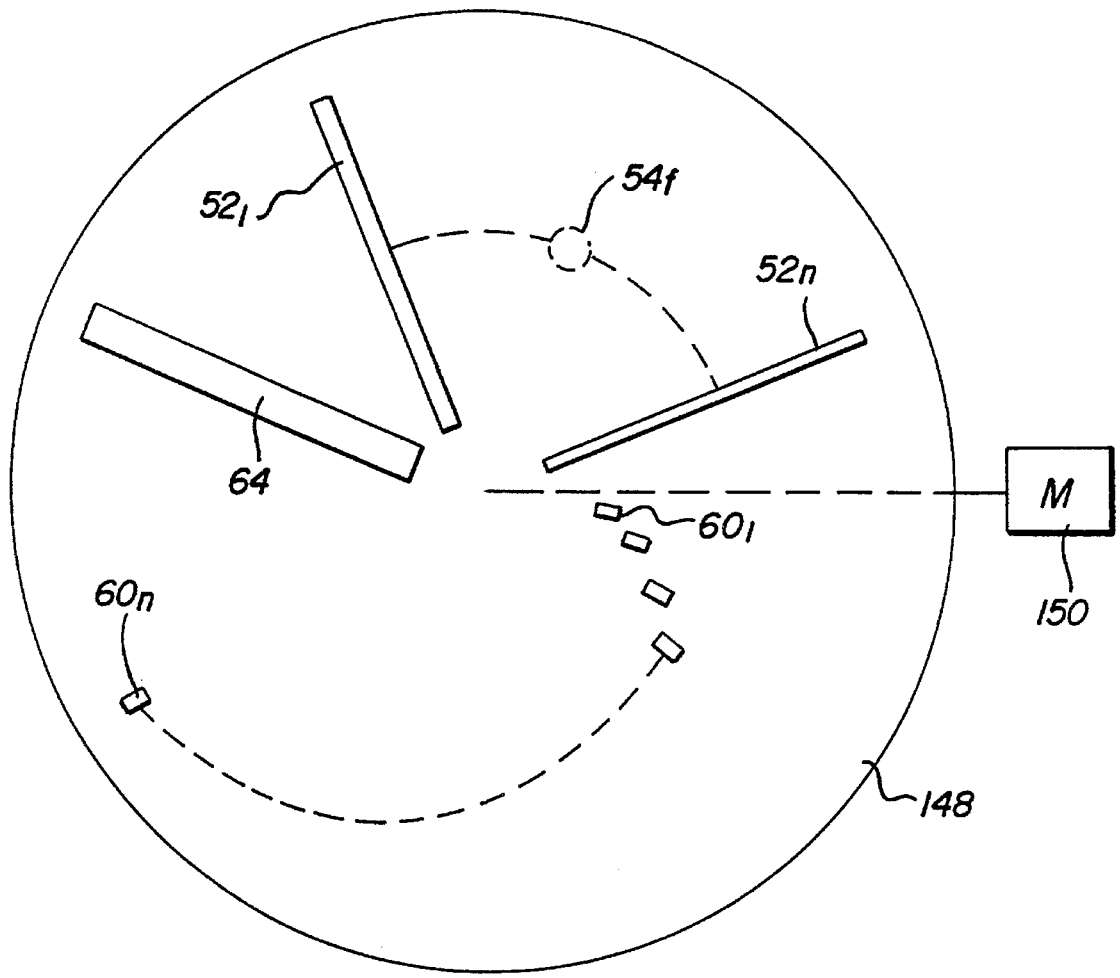
FIG. 10 shows a schematic view of a further alternative embodiment of the invention having a rotating mask for measuring a stationary spot.

Though my invention is particularly suited to measuring the width and length of a scanning spot, the dimensions of stationary spots also may be measured. FIG. 9 shows an alternative embodiment in which the dimensions of a stationary spot $54f$ may be measured using a translating mask 144 driven by a linear actuator 146. The mask is moved past the spot but, otherwise, the mode of operation is the same as previously described. FIG. 10 shows a further alternative embodiment in which a rotating mask 148 is driven by a motor 150. In both embodiments, the function of photodiode 66 is replaced by a suitable position indicator or encoder on the actuator. Only a single photodetector 56 is needed.

Parts List

10 . . . roller, driven or idler
12 . . . web
14 . . . conventional laser scanner
16 . . . scanning beam of light
18 . . . display for output of scanner
20, 22 . . . dead bands at each end
24, 26 . . . spot measurement apparatus of invention
28 . . . frame member
30 . . . bracket plate
32 . . . gusset
34 . . . top plate of 24, 26
36, 38 . . . side plates
40 . . . rear plate
42 . . . bottom plate
44 . . . mounting block
46 . . . planar mirror
48 . . . front plate
50 . . . width measuring aperture plate, an opaque plate or disk
$52_1 \ldots 52_n \ldots$ series of slits oriented perpendicular to width dimension of scanning spot
w . . . width of scanning spot
54 . . . scanning spot
$54_f$ . . . stationary spot
56, $56_W$, $56_L$ . . . photodetector or photomultiplier tube
L . . . length of slits 52
l length of scanning spot
W . . . width of slits 52
S . . . spacing between slits 52
58 . . . length measuring aperture plate, an opaque plate or disk
$60_1 \ldots 60_n \ldots$ series of square or rectangular windows, evenly spaced
62 . . . diagonal line
α . . . angle of line 62 to scan direction
$S_W$ . . . center to center spacing between adjacent windows 60 in width direction
W' . . . width of windows 60
$S_L$ . . . center to center spacing between adjacent windows 60 in length direction
H . . . height of windows 60
64 . . . additional slit for gain control
66 . . . photodiode supported on 48
68 . . . plano-convex lens
70 . . . diffuser
72 . . . magnetic shield for 56

74 ... cross plate
76 ... power supply
78 ... aperture plug
80 ... circuit boards
82 ... terminal strip
84, 86 ... connectors
88 ... transimpedance amplifier
90 ... quantizer
92 ... width increment counter
94 ... length increment counter
96 ... width increment register
98 ... length increment register
100 ... transimpedance amplifier
102 ... quantizer
104 ... peak detector
106 ... difference amplifier
108 ... automatic gain control circuit
110 ... DC to DC converter
112 ... transimpedance amplifier
114 ... peak detector
116 ... difference amplifier
118 ... automatic gain control circuit
120 ... DC to DC converter
122 ... quantizer
124 ... pulse doubler
126, 128 ... digital display
130, 132 ... digital to analog converter
134, 136 ... low pass filter
138 ... missing pulse detector
140, 142 ... switches
144 ... translating mask
146 ... linear actuator
148 ... rotating mask
150 ... motor While my invention has been shown and described with reference to particular embodiments thereof, those skilled in the art will understand that other variations in form and detail may be made without departing from the scope and spirit of my invention.

Having thus described my invention in sufficient detail to enable those skilled in the art to make and use it, I claim as new and desire to secure Letters Patent for:

1. Apparatus for real time measurement of length and width of a spot of light, comprising:

a first mask having a plurality of transparent slits, each slit having a slit length at least as long as an expected maximum spot length, the slits having widths increasing incrementally from a fraction of an expected maximum spot width to at least the expected maximum spot width, and adjacent slits being spaced sufficiently to minimize illumination of more than one slit at a time;

a second mask having a plurality of transparent windows having lengths a fraction of an expected maximum spot length and widths sufficient to provide a window for transmitting a measurable pulse of light, the windows being positioned along a line and adjacent windows being spaced sufficiently to minimize illumination of more than one window at a time;

a member supporting the first and second masks transverse to a path of relative movement between the spot and the masks, with the slits transverse to the path and the line of windows arranged at an angle to the path to provide, transverse to the path, a center-to center window spacing of a fraction of the expected spot length;

at least one photodetector for detecting pulses of light passing through the slits and producing first signals whose amplitudes are proportional to the power of the pulses of light and for detecting pulses of light passing through the windows and producing second signals whose amplitudes are proportional to an irradiance of the pulses of light;

a first comparator for determining if the amplitude of each first signal exceeds a predetermined value and producing a first digital pulse signal;

a first counter for counting the first digital pulse signals as a measure of spot width;

a second comparator for determining if the amplitude of each second signal exceeds a predetermined value and producing a second digital pulse signal; and a second counter for counting the second digital pulse signals as a measure of spot length.

2. The apparatus of claim 1 wherein the spot is scanning and the masks are stationary.

3. The apparatus of claim 1 wherein the spot is stationary and the masks are moving.

4. The apparatus of claim 1 wherein the slit width increases to two and a half times the expected maximum spot width.

5. The apparatus of claim 1 wherein the spacing between adjacent slits is at least four times the expected maximum spot width.

6. The apparatus of claim 1 wherein the spacing between windows is at least five times the expected maximum spot width.

7. The apparatus of claim 1 wherein the window widths are approximately the same as the expected maximum spot width.

8. The apparatus of claim 1 further comprising means for transporting a web to be scanned by the spot; and a means for reflecting the spot to the masks, the means for reflecting being equidistant from the web and the masks.

9. The apparatus of claim 1, further comprising a lens and a diffuser between each mask and the photodetector.

10. Apparatus for real time measurement of width of a spot of light, comprising:

a mask having a plurality of transparent slits, each slit having a slit length at least as long as an expected maximum spot length, the slits having widths increasing incrementally from a fraction of an expected maximum spot width to at least the expected maximum spot width, and adjacent slits being spaced sufficiently to minimize illumination of more than one slit at a time;

a member supporting the mask transverse to a path of relative movement between the spot and the mask, with the slits transverse to the path;

a photodetector for detecting pulses of light passing through the slits and producing signals whose amplitudes are proportional to the power of the pulses of light;

a comparator for determining if the amplitude of each signal exceeds a predetermined value and producing a digital pulse signal; and a counter for counting the digital pulse signals as a measure of spot width.

11. Apparatus for real time measurement of the length of a spot of light, comprising:

a mask having a plurality of transparent windows having lengths a fraction of an expected maximum spot length and widths sufficient to provide a window for transmitting a measurable pulse of light, the windows being positioned along a line and adjacent windows being spaced sufficiently to minimize illumination of more than one window at a time;

a member supporting the mask transverse to a path of relative movement between the spot and the mask, with the line of windows arranged at an angle to the path to provide, transverse to the path, a center-to center window spacing of a fraction of the expected spot length;

a photodetector for detecting pulses of light passing through the windows and producing signals whose amplitudes are proportional to an irradiance of the pulses of light;

a comparator for determining if the amplitude of each signal exceeds a predetermined value and producing a digital pulse signal; and a counter for counting the digital pulse signals as a measure of spot length.

12. A method for real time measurement of length and width of a spot of light, comprising the steps of:

providing a first mask having a plurality of transparent slits, each slit having a slit length at least as long as an expected maximum spot length, the slits having widths increasing incrementally from a fraction of an expected maximum spot width to at least the expected maximum spot width, and adjacent slits being spaced sufficiently to minimize illumination of more than one slit at a time;

providing a second mask having a plurality of transparent windows having lengths a fraction of an expected maximum spot length and widths sufficient to provide a window for transmitting a measurable pulse of light, the windows being positioned along a line and adjacent windows being spaced sufficiently to minimize illumination of more than one window at a time;

supporting the first and second masks transverse to a path of movement of the spot, with the slits transverse to the path and the line of windows arranged at an angle to the path to provide, transverse to the path, a center-to center window spacing of a fraction of the expected spot length;

scanning a spot of light across the slits and windows;

detecting pulses of light passing through the slits and producing first signals whose amplitudes are proportional to the power of the pulses of light;

determining if the amplitude of each first signal exceeds a predetermined value and producing a first digital pulse signal;

counting the first digital pulse signals as a measure of spot width;

detecting pulses of light passing through the windows and producing second signals whose amplitudes are proportional to an irradiance of the pulses of light;

determining if the amplitude of each second signal exceeds a predetermined value and producing a second digital pulse signal; and counting the second digital pulse signals as a measure of spot length.

13. A method for real time measurement of the width of a spot of light, comprising the steps of:

providing a mask having a plurality of transparent slits, each slit having a slit length at least as long as an expected maximum spot length, the slits having widths increasing incrementally from a fraction of an expected maximum spot width to at least the expected maximum spot width, and adjacent slits being spaced sufficiently to minimize illumination of more than one slit at a time;

supporting the mask transverse to a path of relative movement between the spot and the mask, with the slits transverse to the path;

detecting pulses of light passing through the slits and producing signals whose amplitudes are proportional to the power of the pulses of light;

determining if the amplitude of each signal exceeds a predetermined value and producing a digital pulse signal; and counting the digital pulse signals as a measure of spot width.

14. A method for real time measurement of the length of a spot of light, comprising the steps of:

providing a mask having a plurality of transparent windows having lengths a fraction of an expected maximum spot length and widths sufficient to provide a window for transmitting a measurable pulse of light, the windows being positioned along a line and adjacent windows being spaced sufficiently to minimize illumination of more than one window at a time;

supporting the mask transverse to a path of relative movement between the spot and the mask, with the line of windows arranged at an angle to the path to provide, transverse to the path, a center-to center window spacing of a fraction of the expected spot length;

detecting pulses of light passing through the windows and producing signals whose amplitudes are proportional to the irradiance of the pulses of light;

determining if the amplitude of each signal exceeds a predetermined value and producing a digital pulse signal; and counting the digital pulse signals as a measure of spot length.

\* \* \* \* \*